United States Patent Office 3,154,469
Patented Oct. 27, 1964

3,154,469
METHOD OF INCREASING POTASSIUM LEVELS BY ADMINISTERING POTASSIUM SALTS OF ETHYLENE-1:2-DICARBOXYLIC ACID
Roland Yves Mauvernay, Riom, France, assignor to Laboratoire d'Analyses et de Recherches R. Y. Mauvernay, Riom, France
No Drawing. Filed July 10, 1961, Ser. No. 122,617
Claims priority, application France, July 11, 1960, 832,656
4 Claims. (Cl. 167—55)

The present invention relates to new potassium agents, and more particularly to new compounds which may be used for the administration of potassium.

It is a primary object of the present invention to provide new potassium agents.

It is a further object of the present invention to provide new potassium compounds, and methods of production of the same, which compounds can be used for conditions requiring an increase in blood level potassium, for example hypokalemia.

Other objects and advantages of the present invention will be apparent from the following specification.

With the above and other objects is view, the present invention mainly comprises as new compounds potassium acid maleate, dipotassium maleate and dipotassium fumarate. The compound potassium acid maleate has the following formula:

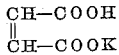

the molecular weight of the compound being 155.

Potassium acid maleate is obtained by the action of 1 mol of potassium, for example in the form of potassium hydroxide or potassium carbonate on maleic anhydride in alcoholic medium. The reaction proceeds as follows:

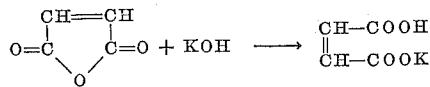

The following example illustrates the production of potassium acid maleate:

EXAMPLE 1

98 g. of maleic anhydride in finely pulverized condition are suspended in 150 cc. of absolute alcohol. 56 g. of potassium dissolved in 75 cc. of distilled water are added slowly while stirring, and under refrigeration.

The mixture is allowed to stand for several hours. The salt precipitates, and is centrifuged, rinsed with absolute alcohol, and then dried.

The resulting potassium acid maleate is insoluble in alcohol, insoluble in ether, soluble in water (42% at 20° C.) and a saturated solution thereof has a pH value of 3. The compound decomposes at 178° C.

The obtained compound is in the form of small, white, brilliant crystals, silky, having an acid taste and rapidly dissolving in the mouth.

The salt reacts with an excess of potassium to give the corresponding dipotassium maleate.

The titer of the potassium can be effected by a flame photometer, as in the case of dipotassium maleate which will be discussed below.

The compound can also be produced by neutralizing a solution of maleic acid with a calculated quantity of potassium carbonate (1 mol of potassium to 1 mol of maleic acid). In this case the resulting mixture is concentrated to a syrupy consistency, and precipitated by absolute alcohol.

The compound dipotassium maleate, which is the most preferred potassium agent in accordance with the present invention, has the following formula:

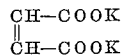

and a molecular weight of 193. Dipotassium maleate is produced by neutralizing maleic acid with potassium, for example in the form of potassium hydroxide or potassium carbonate, or the like, utilizing 2 mols of potassium for each mol of maleic acid. The reaction proceeds in accordance with the following equation:

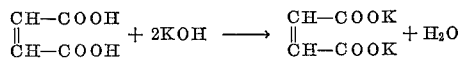

The following example is given to illustrate the production of dipotassium maleate:

EXAMPLE 2

Under refrigeration an aqueous solution of potassium hydroxide containing 11.2 g. of potassium hydroxide in 20 cc. of water is added to a saturated aqueous solution of maleic acid (11.7 g. of maleic acid in 15 cc. of water), the addition being made slowly until neutralization at pH 7.1. The liquid is then evaporated under vacuum resulting in the compound dipotassium maleate.

This compound is in the form of small white brilliant crystals, which do not have any particular taste and which are rapidly dissolved in the mouth.

The compound is insoluble in alcohol, insoluble in ether, very hygroscopic and very soluble in water (50% at 20° C.).

The compound may also be produced by neutralizing a saturated aqueous solution of maleic acid with a saturated solution of potassium carbonate and then evaporation under vacuum.

The ionization constants of maleic acid:

$K_1 = 1.17$ to $1.42 \times 10^{-2}$ (at 25° C.)

$K_2 = 8.5 \times 10^{-7}$ (at 25° C.)

make dipotassium maleate an ion exchanger. The first potassium is easily and rapidly liberated (instantaneous action) and the second is liberated more slowly (action very much more prolonged). As a consequence, dipotassium maleate on the one hand has a reduced toxicity as compared to other potassium agents, and on the other hand it has an increased duration of action.

The double bond is proved by liberating maleic acid by means of a strong acid such as hydrochloric acid. The solution then decolorizes bromine water.

The compound dipotassium fumarate has the following formula:

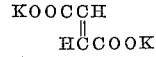

and a molecular weight of 192. The following example illustrates the production of dipotassium fumarate.

EXAMPLE 3

Two equivalents of potassium in the form of an aqueous potassium hydroxide solution are added to a suspension of 11.6 g. of fumaric acid in 50 cc. of water, while agitating. The water is evaporated under vacuum resulting in a crystalline residue, and the crystals are washed with acetone. The resulting crystals are dried at 110° C. The compound is in the form of white crystals which are soluble in water.

As indicated above, the compounds of the present invention may be utilized in all instances wherein it is desired to increase the blood potassium level of a patient. Thus, in any instance of hypokalemia, from whatever cause, the potassium agents of the present invention, and particularly dipotassium maleate, may be used. Thus, the compounds may be used for post operative hypokalemias, diabetic coma, digestive hypokalemia, cardiac insufficiencies, and in cases where patients have been treated with corticoids or have been treated with chlorothiazide.

The dosage of the potassium is determined by means of a flame photometer. A solution is prepared containing:

$$25 < K < 30 \text{ mg./l.}$$

The solution is subjected to a flame photometer and the results are compared with a standard curve established by subjecting a solution of potassium chloride of varying concentration.

The organic acid ion, for example the maleic ion in the case of dipotassium maleate, does not interfere with the dosage. In preparing compositions for the administration of potassium in accordance with the present invention the potassium salts of the present invention, such as dipotassium maleate, may be mixed with any suitable pharmaceutical carrier or excipient such as water, talc, magnesium stearate, sugar, ribose, gum arabic, or the like.

The following examples illustrate compositions prepared in accordance with the present invention:

EXAMPLE 4

Ampoules are prepared of the following composition:

Dipotassium maleate _____ g__ 0.325
Distilled water, q.s. 5 cc.

EXAMPLE 5

Dipotassium maleate dragées are prepared of the following composition:

Dipotassium maleate _____ g__ 0.40
Magnesium stearate and indigotin as colorant, q.s. 0.65 g.

As indicated above, the compounds of the present invention, and particularly dipotassium maleate, are useful as potassium agents and exhibit a remarkably reduced toxicity. Thus, the following toxicity test was carried out on dipotassium maleate, the tests being carried out on mice which were injected with the compound intraperitoneally. The following table indicates the results:

Table 1

| Dose in mg./kg. of body weight | 631 | 794 | 1,000 | 1,259 |
|---|---|---|---|---|
| Number of animals tested | 10 | 10 | 10 | 10 |
| Number of deaths per dose | 2 | 4 | 8 | 10 |

Thus, the $LD_{50}$ of dipotassium maleate (I.P.) is 822 mg./kg.

The toxicity of dipotassium maleate was compared with the toxicity of known potassium salts used for therapeutic purposes.

The $LD_{100}$ of rats, each weighing about 180 grams was determined by continuous intravenous administration of a solution of potassium maleate, the rats having been subjected to anaesthesia of 30 mg./kg. of pentobarbital administered intraperitoneally. The death was determined by a cessation of respiration. The following table summarizes the results:

Table 2

| Weight in grams | Quantity injected in mg. | Duration of the injection in minutes | Speed of administration in cc./minute | Concentration of the solution, mg./cc. | Quantity injected, mg./kg. |
|---|---|---|---|---|---|
| 160 | 48.75 | 3'15'' | 1.5 | 10 | 305 |
| 195 | 73.7 | 4'45'' | 1.5 | 10 | 379 |
| 170 | 62.5 | 4'10'' | 1.5 | 10 | 373.5 |
| 180 | 61.25 | 4'05'' | 1.5 | 10 | 340 |
| 165 | 60 | 4' | 1.5 | 10 | 364 |
| 180 | 60 | 4' | 1.5 | 10 | 332 |

The $LD_{100}$ by this test gave a value of 340 mg./kg.

Similar tests with potassium citrate gave an $LD_{100}$ value of 313 mg./kg. With potassium nitrate the $LD_{100}$ value was 302.19 mg./kg., with potassium oxalate the $LD_{100}$ value obtained was 195 mg./kg. and with potassium chloride the $LD_{100}$ value obtained was 126 mg./kg.

As mentioned above, the dipotassium maleate of the present invention not only has a very low toxicity, but in addition it has both a rapid action and a long duration action so that it is highly effective as a potassium agent.

Experiments carried out on rats over prolonged periods of time, two to three months, and longer, prove that the dipotassium maleate of the present invention does not give rise to any chronic toxicity, and blood tests proved that no abnormal leucocytes were formed, nor was there alteration in growth nor the presence of immature forms. In addition no abnormalities of the red blood cells occurred.

The dipotassium maleate of the present invention was used in cases of post operative hydro-electrolytic disorders and was found to be highly effective. It was also found to be extremely useful in all cases of hypokalemia.

Without further analysis, the foregoing will so fully reveal the gist of the present invention that others can be applying current knowledge readily adapt it for various applications without omitting features that, from the standpoint of prior art, fairly constitute essential characteristics of a generic or specific aspects of this invention and, therefore, such adaptations should and are intended to be comprehended within the meaning and range of equivalence of the following claims.

What is claimed as new and desired to be secured by Letters Patent is:

1. Method of increasing the blood potassium level of a patient requiring the same, which comprises orally administering to such patient a compound selected from the group consisting of potassium acid maleate, dipotassium maleate and dipotassium fumarate.

2. Method of increasing the blood potassium level of a patient requiring the same, which comprises orally administering to such patient potassium acid maleate.

3. Method of increasing the blood potassium level of a patient requiring the same, which comprises orally administering to such patient dipotassium maleate.

4. Method of increasing the blood potassium level of a patient requiring the same, which comprises orally administering to such patient dipotassium fumarate.

References Cited in the file of this patent

UNITED STATES PATENTS

| 1,491,465 | Craver | Apr. 22, 1924 |
| 2,370,579 | Punnett | Feb. 27, 1945 |
| 2,481,412 | Grindrod | Sept. 6, 1949 |
| 2,576,106 | Cusic | Nov. 27, 1951 |
| 2,976,291 | Jacob | Mar. 21, 1961 |
| 3,027,303 | Wolcott | Mar. 27, 1962 |

OTHER REFERENCES

Osol-Farrar: Dispensatory of U.S., 25th Ed., Part I, 1955, page 1091.

Beilstein: Band 2, Syst. No. 179, pp. 740 and 751, 1920.

Forsen: Chem. Abst., vol. 54, p. 4159(a), 1960.

Morton: Chem. Abst., vol. 49, p. 5571(g), 1955.

Hazard: Chem. Abst., vol. 50, p. 12278(d), 1956.

New and Nonofficial Drugs, 1961, p. 581.